(12) United States Patent
Miyako et al.

(10) Patent No.: US 8,664,309 B2
(45) Date of Patent: Mar. 4, 2014

(54) OPTICAL FILM AND PROCESS FOR ITS PRODUCTION

(71) Applicant: Asahi Glass Company, Limited, Chiyoda-ku (JP)

(72) Inventors: Takeomi Miyako, Chiyoda-ku (JP); Takashi Okada, Chiyoda-ku (JP); Koji Sasaki, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/727,320

(22) Filed: Dec. 26, 2012

(65) Prior Publication Data

US 2013/0116370 A1 May 9, 2013

Related U.S. Application Data

(63) Continuation of application No. PCT/JP2011/064588, filed on Jun. 24, 2011.

(30) Foreign Application Priority Data

Jun. 25, 2010 (JP) .................................. 2010-145315

(51) Int. Cl.
*C08K 5/17* (2006.01)

(52) U.S. Cl.
USPC ....................................................... 524/255

(58) Field of Classification Search
USPC ....................................................... 524/255
See application file for complete search history.

(56) References Cited

U.S. PATENT DOCUMENTS 6,818,304 B2    11/2004    Miyako et al.

FOREIGN PATENT DOCUMENTS

| JP | 43-25335 | 11/1968 | | |
|----|----------|---------|---|---|
| JP | 2001-207142 | 7/2001 | | |
| JP | 2005-049848 | * 2/2005 | ............... | G02B 5/22 |
| JP | 2005-49848 | 2/2005 | | |
| JP | 2006-227193 | 8/2006 | | |
| JP | 2007-4098 | 1/2007 | | |
| JP | 2008-26727 | 2/2008 | | |
| JP | 2010-502563 | 1/2010 | | |
| WO | 2009/145057 | 12/2009 | | |

OTHER PUBLICATIONS

English Translation of JP2005-049848. Obtained at http://www19.ipdl.inpit.go.jp/PA1/cgi-bin/PA1DETAIL on Jul. 5, 2013.*
International Search Report issued Sep. 27, 2011 in PCT/JP2011/064588 filed Jun. 24, 2011.

* cited by examiner

*Primary Examiner* — Ling Choi
*Assistant Examiner* — Lanee Reuther
(74) *Attorney, Agent, or Firm* — Oblon, Spivak, McClelland, Maier & Neustadt, L.L.P.

(57) ABSTRACT

To provide an optical film wherein deterioration of a diimonium compound in an adhesive layer is prevented, and a process for its production. An optical film comprising a base film and an adhesive layer which is formed on the base film and has a massive material dispersed in an adhesive, wherein the massive material contains a diimonium compound represented by the following formula (1) and has a melting point of at least 200° C.:

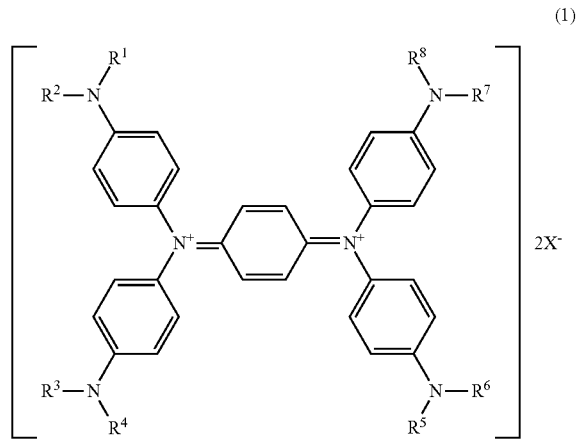

(1)

wherein $R^1$ to $R^8$ represent each independently an unsubstituted or substituted, same or different, $C_{1-6}$ aliphatic hydrocarbon group, provided that from 4.9 to 8 groups among $R^1$ to $R^8$ are a $C_{1-3}$ aliphatic hydrocarbon group (in which some of hydrogen atoms may be substituted by halogen atoms), and $X^-$ represents $(R^9SO_2)_3C^-$ wherein $R^9$ represents a $C_{1-4}$ aliphatic hydrocarbon group which is unsubstituted or substituted by a halogen atom.

19 Claims, No Drawings

OPTICAL FILM AND PROCESS FOR ITS PRODUCTION

TECHNICAL FIELD

The present invention relates to an optical film and a process for its production, particularly to an optical film to be suitably used for an optical filter for a display device, and a process for its production.

BACKGROUND ART

From a plasma display panel (PDP), near infrared ray is emitted together with visible light. However, near infrared ray is also utilized in near infrared remote control for household electric appliances such as household-use televisions, air-conditioners, video cassette recorders, etc. and in other communication equipments, whereby a glitch in such instruments may sometimes be caused by near infrared ray from the plasma display panel. In order to avoid such a trouble, it is common to provide a near infrared absorbing film on the front surface (viewing surface) of a plasma display panel to adjust the transmittance of near infrared ray of from 850 nm to 1,100 nm to be e.g. at most 20%.

Such a near infrared absorbing film is usually one having a near infrared absorbing colorant incorporated in a resin film and is bonded on a transparent substrate such as a glass sheet together with another functional film such as an antireflection film or an electromagnetic wave-shielding film, to constitute an optical filter. However, such an optical filter is required to provide, in addition to the near infrared absorbing film, an adhesive layer separately to bond it, and thus it is not necessarily excellent in productivity.

Therefore, in order to omit the near infrared absorbing film, it has been proposed to incorporate a near infrared absorbing colorant in the adhesive layer (e.g. Patent Document 1). As such a near infrared absorbing colorant, various colorants of e.g. phthalocyanine type, diimonium type, polymethine type, metal complex type, squarylium type, cyanine type, indoaniline type, etc. may for example, be mentioned, and among them, a diimonium type colorant may be mentioned as preferred, since the near infrared absorption wavelength region is broad.

However, a diimonium type colorant is usually poor in heat resistance or moisture resistance and is likely to be deteriorated particularly in a case where it is incorporated in an adhesive layer. By such deterioration of the colorant, not only the near infrared absorption ability will decrease, but also an optical property such as visible transmittance will decrease. Therefore, it has been also proposed to prevent such deterioration by using a diimonium type colorant having specific anions (e.g. Patent Document 2).

PRIOR ART DOCUMENTS

Patent Documents

Patent Document 1: JP-A-2001-207142
Patent Document 2: JP-A-2007-004098

DISCLOSURE OF INVENTION

Technical Problem

As mentioned above, a study has been made to prevent deterioration of a diimonium type colorant, but the deterioration in an adhesive layer has not sufficiently be prevented. The present invention has been made to solve such a problem, and has an object to provide an optical film wherein deterioration of a diimonium type colorant in an adhesive layer is prevented, and a process for its production.

Solution to Problem

The optical film of the present invention is an optical film comprising a base film and an adhesive layer which is formed on the base film and has a massive material dispersed in an adhesive, wherein the massive material contains a diimonium compound represented by the following formula (1) and has a melting point of at least 200° C.:

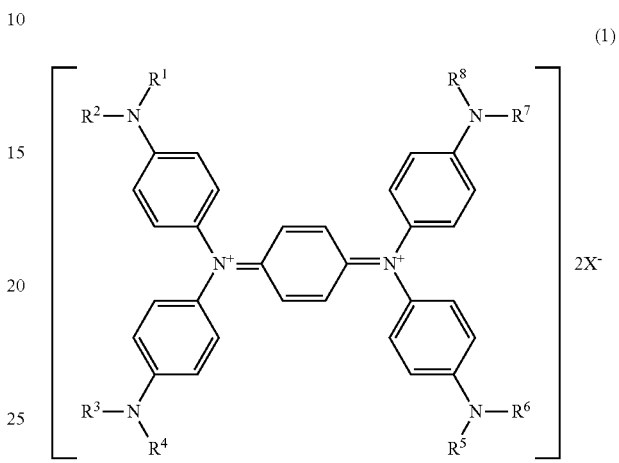

(1)

wherein $R^1$ to $R^8$ represent each independently an unsubstituted or substituted, same or different, $C_{1-6}$ aliphatic hydrocarbon group, provided that from 4.9 to 8 groups among $R^1$ to $R^8$ are a $C_{1-3}$ aliphatic hydrocarbon group (in which some of hydrogen atoms may be substituted by halogen atoms), and $X^-$ represents $(R^9SO_2)_3C^-$, wherein $R^9$ represents a $C_{1-4}$ aliphatic hydrocarbon group which is unsubstituted or substituted by a halogen atom.

The $C_{1-3}$ aliphatic hydrocarbon group among $R^1$ to $R^8$ is preferably a propyl group, and other aliphatic hydrocarbon groups are preferably butyl groups.

The process for producing an optical film of the present invention comprises a mixing step of mixing an adhesive, a diimonium compound represented by the following formula (1) and a solvent capable of dissolving the diimonium compound, to prepare a coating fluid, a coating step of applying the coating fluid on a base film to form a coating layer, and a heating step of heating the coating layer at a temperature of at least 100° C. to form an adhesive layer:

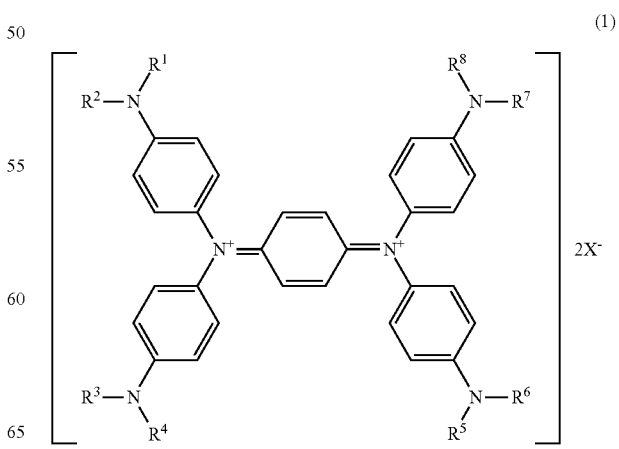

(1)

wherein $R^1$ to $R^8$ represent each independently an unsubstituted or substituted, same or different, $C_{1-6}$ aliphatic hydrocarbon group, provided that from 4.9 to 8 groups among $R^1$ to $R^8$ are a $C_{1-3}$ aliphatic hydrocarbon group (in which some of hydrogen atoms may be substituted by halogen atoms), and $X^-$ represents $(R^9SO_2)_3C^-$, wherein $R^9$ represents a $C_{1-4}$ aliphatic hydrocarbon group which is unsubstituted or substituted by a halogen atom.

In the above mixing step, it is preferred that the diimonium compound and the solvent are mixed, and then, the adhesive is added and mixed thereto. The above solvent is preferably a ketone type solvent.

Advantageous Effects of Invention

The optical film of the present invention is excellent in productivity such that a task of providing a conventional near infrared absorbing film can be omitted by dispersing in an adhesive layer a diimonium compound having a specific structure, as a diimonium type colorant, so as to form a massive material having a melting point of at least 200° C., and it can further be made to be an optical film in which deterioration of the diimonium compound in the adhesive layer can also be prevented.

Further, according to the process of the present invention, the diimonium compound having a specific structure is dissolved in a solvent and then heated to a temperature of at least 100° C., whereby it is possible to produce an optical film wherein the diimonium compound having a specific structure is dispersed in the form of a massive material having a melting point of at least 200° C., in the adhesive layer, and its deterioration is prevented.

DESCRIPTION OF EMBODIMENTS

The optical film of the present invention comprises a base film and an adhesive layer formed on this base film. The present invention is characterized in that a massive material which contains a diimonium compound represented by the following formula (1) (hereinafter referred to simply as a diimonium compound) and has a melting point of at least 200° C., is dispersed in an adhesive.

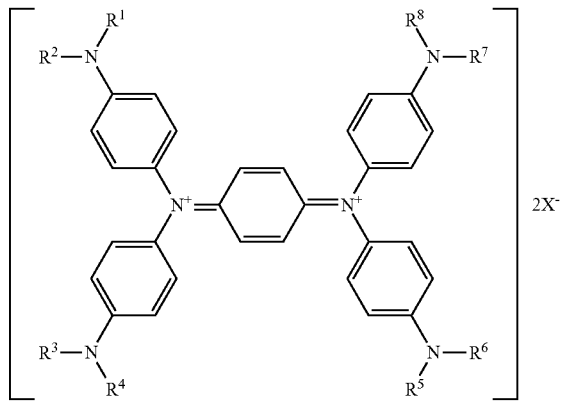

(1)

wherein $R^1$ to $R^8$ represent each independently an unsubstituted or substituted, same or different, $C_{1-6}$ aliphatic hydrocarbon group, provided that from 4.9 to 8 groups among $R^1$ to $R^8$ are a $C_{1-3}$ aliphatic hydrocarbon group (in which some of hydrogen atoms may be substituted by halogen atoms), and $X^-$ represents $(R^9SO_2)_3C^-$, wherein $R^9$ represents a $C_{1-4}$ aliphatic hydrocarbon group which is unsubstituted or substituted by a halogen atom.

According to the present invention, by using such a diimonium compound, it is possible to effectively prevent deterioration of the diimonium compound in an adhesive layer, while making the productivity excellent by omitting a conventional near infrared absorbing film. Specifically, a diimonium compound of the formula (1) is used, and a massive material containing such a diimonium compound and having a melting point of at least 200° C., is dispersed in an adhesive layer, whereby it is possible to effectively prevent deterioration of the diimonium compound in the adhesive layer. This massive material may contain an adhesive, etc. as other components in a small amount.

Here, if any of $R^1$ to $R^8$ in the formula (1) has more than 6 carbon atoms, or if among $R^1$ to $R^8$, ones having from 1 to 3 carbon atoms are less than 4.9 groups, the diimonium compound cannot be agglomerated or crystallized by the after-described production process, and the massive material containing the diimonium compound cannot be made to be one having a melting point of at least 200° C., and consequently, it is not possible to prevent deterioration of the diimonium compound. By adjusting $R^1$ to $R^8$ to be ones having from 1 to 6 carbon atoms and at the same time, adjusting at least 4.9 groups among them to be ones having from 1 to 3 carbon atoms, it is possible to make the melting point of the massive material containing the diimonium compound to be at least 200° C., thereby to prevent the deterioration.

The number of $C_{1-3}$ groups (hereinafter referred to as the number of substituent groups) is not necessarily limited so long as it is at least 4.9 groups, and it may be 8 groups as the upper limit, i.e. all of $R^1$ to $R^8$ may be $C_{1-3}$ groups. However, if the number of substituent groups becomes large, the solubility in a solvent to be used for forming an optical film, particularly an adhesive layer, tends to decrease, and it becomes difficult to incorporate such a compound in a large amount, whereby the near infrared absorbing ability tends to decrease. Therefore, the number of substituent groups is preferably at most 7 groups, more preferably at most 6 groups.

Such a number of substituent groups can be measured by high-performance liquid chromatography. At that time, the number of substituent groups to be measured is not necessarily uniform and has a distribution to some extent. Therefore, in the present invention, the number of substituent groups having the highest proportion in distribution is adopted.

A case where the massive material has no melting point, represents that the diimonium compound is contained substantially in a dissolved state in the massive material. On the other hand, a case where the massive material has a melting point, represents that the diimonium compound is present in the massive material in such a state as contained in the massive material.

However, even in a case where the massive material has a melting point, if the melting point of the massive material containing a diimonium compound is less than 200° C., it tends to be deteriorated. Therefore, in the present invention, the melting point of the massive material is set to be at least 200° C. The melting point of the massive material is not particularly limited so long as it is at least 200° C., but it is usually at most 250° C., preferably at most 240° C., more preferably at most 230° C.

Further, the melting point of the massive material is preferably lower by from 1 to 20° C., more preferably lower by from 2 to 10° C., further preferably lower by from 3 to 8° C., than the melting point of the contained diimonium compound. When the melting point is within the above range, the proportion of the diimonium compound contained in the massive material can be made high, and it is possible to prevent deterioration of the diimonium compound, such being desirable. The melting point of the massive material can be measured by means of e.g. a differential scanning calorimeter.

The $C_{1-3}$ aliphatic hydrocarbon group for $R^1$ to $R^8$ may be either an aliphatic hydrocarbon group having no substituent or an aliphatic hydrocarbon group having a substituent. The aliphatic hydrocarbon group having no substituent may, for example, be a linear or branched saturated aliphatic hydrocarbon or unsaturated aliphatic hydrocarbon group such as a methyl group, an ethyl group, a n-propyl group, an i-propyl group, a vinyl group, an allyl group or a propenyl group. Further, the aliphatic hydrocarbon group having a substituent may, for example, be a 2-cyanoethyl group. Among them, a n-propyl group or an i-propyl group may, for example, be preferred, and it is preferred that all of $R^1$ to $R^8$ are n-propyl groups or i-propyl groups.

The $C_{4-6}$ aliphatic hydrocarbon group for $R^1$ to $R^8$ may be either an aliphatic hydrocarbon having no substituents or an aliphatic hydrocarbon group having a substituent. The aliphatic hydrocarbon group having no substituent may, for example, be a linear or branched saturated aliphatic hydrocarbon or unsaturated aliphatic hydrocarbon group such as a n-butyl group, an i-butyl group, a t-butyl group, a n-pentyl group, an i-pentyl group or a t-pentyl group. Further, the aliphatic hydrocarbon group having a substituent may, for example, be an aliphatic hydrocarbon group such as a 3-cyanopropyl group, a 4-cyanobutyl group, a 3-methoxypropyl group or a 4-methoxybutyl group.

On the other hand, $X^-$ is $(R_9SO_2)_3C^-$, wherein $R^9$ is a $C_{1-4}$ aliphatic hydrocarbon group which is unsubstituted or substituted by a halogen atom, including e.g. a saturated linear alkyl group such as a methyl group, a dichloromethyl group, a dibromomethyl group, a difluoromethyl group, a trifluoromethyl group, an ethyl group, a monofluoroethyl group, a difluoroethyl group, a trifluoroethyl group, a tetrafluoroethyl group, a pentafluoromethyl group, a pentafluoropropyl group, a hexafluoropropyl group or a periluorobutyl group; an unsaturated alkyl group such as an allyl group, a trifluoroethylene group or a tetrafluoroallyl group; a branched alkyl group such as an isopropyl group or a pentafluoroisopropyl group; etc.

Among them, one having fluorine atoms is preferred from the viewpoint of the moisture resistance of the diimonium compound. For example, a difluoromethyl group, a trifluoromethyl group, a trifluoroethyl group, a pentafluoroethyl group, a tetrafluoropropyl group, a heptafluoropropyl group or a periluorobutyl group is preferred, and a trifluoromethyl group is particularly preferred.

Such a diimonium compound can be synthesized, for example, as follows. That is, an Ullmann reaction product of p-phenylenediamine and 1-chloro-4-nitrobenzene, is reduced to obtain N,N,N',N'-tetrakis(p-aminophenyl)-p-phenylenediamine which is then dissolved in N,N-dimethylformamide, and an alkyl bromide is added thereto, followed by a reaction, for example, at 130° C. for 10 hours.

At that time, by suitably selecting the number of carbon atoms in the alkyl bromide, it is possible to adjust the number of substituent groups in the diimonium compound. For example, by using only a $C_{1-3}$ alkyl bromide, it is possible to obtain one wherein the number of substituent groups is 8 groups. Further, by using a $C_{1-3}$ alkyl bromide and a $C_{4-6}$ alkyl bromide in combination, it is possible to obtain one wherein the number of substituent groups is less than 8 groups.

The reaction solution is subjected to filtration after cooling. To the filtrate, methanol is added, followed by stirring, for example, at a temperature of at most 5° C. for 1 hour, whereupon formed crystals are collected by filtration, washed with methanol and then dried. The obtained crystals are added to N,N-dimethylformamide and dissolved, for example, at 60° C., whereupon an aqueous solution of tris(trifluoromethanesulfonyl) carbonium acid is added, and further, one having silver nitrate dissolved in N,N-dimethylformamide, is added, followed by a reaction, for example, for about 30 minutes.

After cooling the reaction solution, precipitated silver was filtered off, and to the filtrate, water is slowly dropwise added, followed by stirring for 15 minutes. Formed crystals are collected by filtration, washed with water and dried to obtain a diimonium compound.

In addition to the diimonium compound, the adhesive layer may contain another near infrared absorbing colorant having the maximum absorption wavelength ($\lambda_{max}$) within a range of from 800 nm to 1,100 nm, within a range not to impair the effects of the present invention. Such another near infrared absorbing colorant includes, for example, an inorganic pigment, an organic pigment, an organic dye, etc.

The inorganic pigment includes, for example, a cobalt colorant, an iron colorant, a chromium colorant, a titanium colorant, a vanadium colorant, a zirconium colorant, a molybdenum colorant, a ruthenium colorant, a platinum colorant, an ITO colorant, an ATO colorant, etc.

The organic pigment and the organic dye include, for example, a diimonium colorant other than the above-described diimonium compound, an anthraquinone colorant, an aluminum colorant, a cyanine colorant, a merocyanine colorant, a croconium colorant, a squarylium colorant, an azulenium colorant, a polymethine colorant, a naphthoquinone colorant, a pyrilium colorant, a phthalocyanine colorant, a naphthalocyanine colorant, a naphtholactam colorant, an azo colorant, a condensed azo colorant, an indigo colorant, a perynone colorant, a perylene colorant, a dioxazine colorant, a quinacridone colorant, an isoindolinone colorant, a quinophthalone colorant, a pyrrole colorant, a thioindigo colorant, a metal complex colorant, a diol type metal complex colorant, an indolephenol colorant, a triallylmethane colorant, etc.

Such another near infrared absorbing colorant is particularly preferably a colorant having the maximum absorption wavelength ($\lambda_{max}$) within a range of from 800 nm to 900 nm. By incorporating such a colorant, near infrared ray in a broad range may efficiently be absorbed.

The content of the colorant in the adhesive layer i.e. the total content of the diimonium compound and another near infrared absorbing colorant, is preferably from 0.1 part by mass to 20.0 parts by mass, more preferably from 1.0 part by mass to 15.0 parts by mass, per 100 parts by mass of the adhesive. By adjusting the colorant content to be at least 0.1 part by mass, it is possible to obtain a sufficient near infrared absorption ability. Further, by adjusting the colorant content to be at most 20.0 parts by mass, the stability of the colorant can be made excellent.

Further, the proportion of the diimonium compound in the entire colorant is preferably at least 50 mass %, more preferably at least 60 mass %, further preferably at least 70 mass %, in 100 mass % of the entire colorant. By adjusting the proportion of the diimonium compound to be at least 50 mass %, it is possible to effectively prevent deterioration of the colorant while maintaining the near infrared absorption ability to be excellent.

In addition to the diimonium compound and another near infrared absorbing colorant, the adhesive layer may contain e.g. a color compensation colorant having the maximum absorption wavelength within a range of from 300 nm to 800 nm, a leveling agent, an antistatic agent, a heat stabilizer, an antioxidant, a dispersing agent, a flame retardant, a lubricant, a plasticizer, an ultraviolet absorber, etc. As the ultraviolet absorber, a benzotriazole type ultraviolet absorber is preferred.

The adhesive may, for example, be an acrylic adhesive, a silicone-type adhesive, a urethane-type adhesive or a butadiene-type adhesive. Among them, an acrylic adhesive is preferably employed. The acrylic adhesive is a polymer containing acrylic monomer units as the main component, and the acrylic monomer may, for example, be (meth)acrylic acid, itaconic acid, (anhydrous) maleic acid, (anhydrous) fumaric acid, crotonic acid, or an alkyl ester thereof. In the present invention, (meth)acrylic acid is used as a general term for acrylic acid and methacrylic acid. The term (meth)acrylate is also used in the same manner.

The molecular weight of the acrylic adhesive is preferably one within a range of from 500,000 to 2,000,000 by weight average molecular weight. When the weight average molecular weight is at least 500,000, the adhesion to an object to be bonded and the adhesion durability become sufficient, such being desirable. When it is at most 2,000,000, the viscosity will be proper, and the coated surface will be excellent in smoothness, such being desirable. Further, it is not required to use a solvent to optimize the viscosity. When the adhesion, the adhesion durability, the coating property, etc. are taken into consideration, such a weight average molecular weight is preferably from 500,000 to 2,000,000, particularly preferably from 500,000 to 1,000,000. Here, the weight average molecular weight is a value measured by a gel permeation chromatography (GPC) method and calculated as polystyrene.

Among acrylic monomers, preferred is one containing, as the main component, (meth)acrylic acid or its alkyl ester. The alkyl ester of (meth)acrylic acid may, for example, be methyl (meth)acrylate, ethyl (meth)acrylate, propyl (meth)acrylate, n-butyl (meth)acrylate, n-pentyl (meth)acrylate, n-hexyl (meth)acrylate, n-heptyl (meth)acrylate, n-octyl (meth)acrylate, 2-ethylhexyl (meth)acrylate, isononyl (meth)acrylate, n-decyl (meth)acrylate or isodecyl (meth)acrylate.

The acrylic adhesive preferably has an acid value of at most 10 mgKOH/g. Here, the acid value may be 0 mgKOH/g. The acid value is more preferably at most 7 mgKOH/g, further preferably at most 5 mgKOH/g. By adjusting the acid value to be at most 10 mgKOH/g, the durability can be made high. The acid value here is a value obtained by titration of alcoholic potassium hydroxide (KOH) by using phenolphthalein as the indicator.

To adjust the acid value to be at most 10 mgKOH/g, at the time of polymerizing the acrylic monomer, the amount of acrylic acid to be copolymerized may be adjusted so that the acid value will be within the above range. Acrylic adhesives having an acid value of at most 10 mgKOH/g are commercially available, and among them, a proper one may be selected for use. Further, in the present invention, the glass transition point (Tg) of the acrylic adhesive is preferably from −60° C. to 40° C., more preferably from −50° C. to 10° C.

Further, as the case requires, monomers other than the acrylic monomer may also be used. Examples of such other monomers to be used include a vinyl ester such as vinyl acetate or vinyl propionate; an olefin such as ethylene, propylene or isobutylene; a halogenated olefin such as vinyl chloride or vinylidene chloride; a styrene monomer such as styrene or α-methylstyrene; a diene monomer such as butadiene, isoprene or chloroprene; a nitrile monomer such as acrylonitrile or methacrylonitrile; an acrylamide monomer such as acrylamide, N,N-dimethylacrylamide or N,N-dimethylmethacrylamide, etc. They may be used alone or in combination as a mixture of two or more of them.

Among these monomers, an acrylamide monomer is preferred from such a viewpoint that an effect to accelerate gelation of the adhesive layer is obtainable. In the present invention, the content of such acrylamide monomer units in the (meth)acrylic acid ester comonomer is preferably from 0.05 mass % to 3 mass %, more preferably from 0.1 mass % to 2 mass %, based on the total amount of the adhesive.

In order to increase the cohesion of the adhesive, it is preferred to use a monomer having a functional group (such as a hydroxy group, a glycidyl group, etc.) which can be a crosslinking point. The monomer having a functional group which can be a crosslinking point, may, for example, be hydroxyethyl acrylate, hydroxyethyl methacrylate, glycidyl acrylate or glycidyl methacrylate.

In a case where such a monomer having a crosslinking point is used, it is preferred to add a crosslinking agent. By crosslinking a polymer by reacting the crosslinking agent at crosslinking points, it is possible to secure the cohesion. The crosslinking agent may, for example, be a melamine resin, an urea resin, an epoxy resin, a metal oxide, a metal salt, a metal hydroxide, a metal chelate, a polyisocyanate, a carboxy group-containing polymer, an acid anhydride or a polyamine, and the crosslinking agent is suitably selected for use depending upon the type of the functional group which can be a crosslinking point. As the crosslinking agent to be used in the present invention, an isocyanate type crosslinking agent such as a polyisocyanate, is preferred.

In the present invention, the isocyanate type crosslinking agent may, for example, be an aromatic polyisocyanate such as tolylene diisocyanate, diphenylmethane diisocyanate or xylylene diisocyanate, an aliphatic polyisocyanate such as hexamethylene diisocyanate, or an alicyclic polyisocyanate such as isophorone diisocyanate or hydrolyzed diphenylmethane diisocyanate. It may further be a biuret form or an isocyanurate form of such a polyisocyanate, or an adduct form having such a polyisocyanate modified with a low molecular weight active hydrogen-containing compound such as ethylene glycol, propylene glycol, neopentyl glycol, trimethylolpropane or castor oil.

In the present invention, one type of such isocyanate type crosslinking agents may be used alone, or two or more types of them may be used in combination. Among them, trimethylolpropane-modified xylylene diisocyanate is preferably employed, whereby an adhesive layer thereby formed undergoes little hue change, even when a heat load is exerted thereto.

In a case where the acrylic adhesive and the isocyanate type crosslinking agent are used in the adhesive in the present invention, the ratio of the isocyanate group in the isocyanate type crosslinking agent to the hydroxy group in the acrylic adhesive i.e. [NCO]/[OH] (molar ratio) is preferably from 0.05 to 2, more preferably from 0.1 to 1.5, further preferably from 0.2 to 1.2. By adjusting [NCO]/[OH] to be within the above range, it is possible to form a proper crosslinked structure, to obtain a desired gel fraction, to obtain excellent removability free from adhesive deposit and to form an adhesive layer excellent also in durability, such being desirable.

With a view to obtaining excellent removability free from adhesive deposit and obtaining excellent durability, the gel fraction of the adhesive layer is preferably at least 85%, more preferably at least 90%.

In the present invention, it is preferred that the adhesive contains a silane coupling agent. The silane coupling agent is preferably employed to bond an adhesive optical film of the present invention to a front display glass portion of PDP with a proper adhesive strength and to obtain good retention strength and durability.

As the silane coupling agent in the present invention, it is possible to preferably use an organic silicon compound having at least one alkoxysilyl group in its molecule. Such a silane coupling agent may, for example, be triethoxysilane, vinyl tris(2-methoxyethoxy)silane, 3-methacryloxypropyltrimethoxysilane, 3-glycidoxypropyltrimethoxysilane, 2-(3,4-epoxycyclohexyl)ethyltrimethoxysilane, 3-glyicidoxypropyltriethoxysilane, 3-glycidoxypropyl(methyl)diethoxysilane, 2-glycidoxyethyltriethoxysilane, 2-glycidoxyethyl(methyl)diethoxysilane, 3-(3,4-epoxycyclohexyl)propyltriethoxysilane, 3-(3,4-epoxycyclohexyl)propyl(methyl)diethoxysilane, 2-(3,4-epoxycyclohexyl)ethyltriethoxysilane, 2-(3,4-epoxycyclohexyl)ethyl(methyl)diethoxysilane, N2-(aminoethyl)-3-aminopropyltrimethoxysilane, N2-(aminoethyl)-3-aminopropylmethyldimethoxysilane, 3-aminopropyltriethoxysilane, N-phenyl-3-aminopropyltrimethoxysilane, 3-mercaptopropyltrimethoxysilane, 3-chloropropyltrimethoxysilane, 3-aminopropyltrimethoxysilane, 3-aminopropyl-tris(2-methoxy-ethoxy)silane, N-methyl-3-aminopropyltrimethoxysilane, N-vinylbenzyl-3-aminopropyltriethoxysilane, triaminopropyltrimethoxysilane or 3-ureidopropyltrimethoxysilane. Among them, an epoxy type silane coupling agent is preferred.

In the present invention, one of the above silane coupling agents may be used alone, or two or more of them may be used in combination. The content of the silane coupling agent is preferably from 0.01 part by mass to 1 part by mass, more preferably from 0.05 part by mass to 0.5 part by mass, further preferably from 0.1 part by mass to 0.3 part by mass, per 100 parts by mass of the acrylic adhesive. It is preferred that the content of the silane coupling agent is within the above range, since it is thereby possible that in a case where the adhesive layer and glass are bonded directly in contact with each other, it is possible to bond them by a proper adhesive strength and to obtain a good retention strength and durability.

The thickness of the adhesive layer is preferably from 0.3 μm to 50 μm more preferably from 0.5 μm to 30 μm. By adjusting the thickness of the adhesive layer to be at least 0.3 μm, the near infrared absorbing ability can be made to be sufficient, and by adjusting it to be at most 50 μm, it is possible to prevent the solvent from remaining at the time of forming the adhesive layer.

The base film is not particularly limited so long as it is in a film-form, and it may, for example, be a release film having detachability, a support film or a functional film having other functions.

The functional film may, for example, be an ultraviolet absorption film to prevent deterioration of a colorant by ultraviolet ray thereby to improve the light resistance, or a color compensation film to absorb light in a specific wavelength region other than ultraviolet ray. The light in a specific wavelength region to be absorbed by the color compensation film may include, not only visible light, but also near infrared ray, and the film may be one to absorb a plurality of specific wavelength regions.

Further, the functional film may be an antireflection film to improve the visibility of an image, or an electromagnetic wave shielding film to shield electromagnetic waves emitted from a display device such as a plasma display panel.

The material for the base film is not particularly limited, however, a resin film is preferred, since it is excellent in handling efficiency at the time of producing an optical film. The resin film may be one made of any one of e.g. a polyester such as polyethylene terephthalate (PET) or polybutylene terephthalate (PBT); a polyolefin such as polyethylene or polypropylene; a polyacrylate such as polymethyl methacrylate (PMMA); a polycarbonate (PC); a polystyrene; a triacetate; a polyvinyl alcohol; a polyvinyl chloride; a polyvinylidene chloride; an ethylene/vinyl acetate copolymer; a polyvinyl butyral; a polyurethane; and cellophane. The film may be composed of one or more layers.

The optical film of the present invention is useful as an optical filter for a display device, such as a flat-screen display device such as a plasma display panel (PDP), a plasma address liquid crystal (PALC) display panel or a field emission display (FED) panel, or a cathode ray tube (CRT) display device.

The optical filter is one having at least one functional film bonded to a substrate, and the optical film of the present invention is used as such a functional film, or as an adhesive layer to bond such a functional film. The substrate may, for example, be a transparent substrate made of glass or a polymer material having high rigidity. Preferred may, for example, be a transparent substrate made of e.g. glass, tempered or semitempered glass, a polycarbonate or a polyacrylate.

The optical filter is preferably achromatic, since it is usually disposed on the viewing side of a display device. According to standard illuminant C calculated in accordance with JIS Z8701-1999, the chromaticity coordinate corresponding to achromatic color is $(x,y)=(0.310, 0.316)$, and accordingly, the chromaticity coordinate of an optical filter is preferably $(x,y)=(0.310\pm0.100, 0.316\pm0.100)$. Adjustment of the chromaticity can be carried out, for example, by suitably selecting the type and content of the colorant to be incorporated to the adhesive layer, or the type of the functional film or the substrate.

Further, the average visible transmittance of the optical filter is preferably at least 25%, more preferably at least 45%. Adjustment of the average visible transmittance can be carried out, for example, by selecting a highly transparent one as the functional film or the substrate, or by suitably selecting the type, content, etc. of the colorant to be incorporated to the adhesive layer.

Now, a process for producing an optical film of the present invention will be described.

The process for producing an optical film of the present invention comprises a mixing step of mixing an adhesive, a diimonium compound represented by the formula (1) and a solvent capable of dissolving the diimonium compound, to prepare a coating fluid, a coating step of applying the coating fluid on a base film to form a coating layer, and a heating step of heating the coating layer at a temperature of at least 100° C. to form an adhesive layer.

In the present invention, particularly, the diimonium compound of the formula (1) is used, and this diimonium compound is once dissolved in a solvent and then heated to at least 100° C., whereby the diimonium compound is effectively agglomerated or crystallized to form a massive material having a melting point of at least 200° C. It is thereby possible to produce an optical film wherein deterioration of the diimonium compound in the adhesive layer is prevented.

The adhesive and the diimonium compound to be used in the mixing step may be ones which have been described above. The solvent is not particularly limited so long as it is capable of dissolving the diimonium compound, but a ketone type solvent is preferably used, since it is excellent in dissolving the diimonium compound. As the ketone type solvent, for example, acetone, methyl ethyl ketone (MEK), methyl isobutyl ketone (MIBK) or cyclohexanone may preferably be used. MEK is particularly preferably used as the solvent.

In the mixing step, it is preferred that the adhesive, the diimonium compound and the solvent, as well as other components as the case requires, are blended and mixed to sufficiently dissolve the diimonium compound thereby to prepare a coating fluid. If dissolution of the diimonium compound is not sufficient, even if the diimonium compound is effectively agglomerated or crystallized by heating, it may not be possible to form a massive material having a melting point of at least 200° C.

The preparation method for the coating fluid is not particularly limited, but it is preferred that firstly, the diimonium compound and the solvent are mixed and then the adhesive is added thereto, followed by mixing. By such a method, it becomes easy to dissolve the diimonium compound in the solvent. The respective mixing operations are carried out preferably for at least one minute, more preferably at least 10 minutes, with a view to sufficiently dissolving the diimonium compound.

The amount of the solvent to be blended varies, for example, depending upon the solubility of the diimonium compound in the solvent, specifically depending upon the number of substituent groups in the diimonium compound. However, for example, in a case where the diimonium compound and the solvent are preliminarily mixed, the amount of the solvent is made to be preferably at least 20 parts by mass, more preferably at least 30 parts by mass, per 1 part by mass of the diimonium compound. If the solvent is less than 20 parts by mass per 1 part by mass of the diimonium compound, it may not be possible to sufficiently dissolve the diimonium compound. The solvent is sufficient, when it is 200 parts by mass per 1 part by mass of the diimonium compound, and usually it may be at most 150 parts by mass.

Further, the amount of the solvent to be incorporated to the total amount of the diimonium compound and the adhesive may also be suitably selected depending upon the type of the adhesive, the coating method, etc. For example, the solvent may be made to be from 10 parts by mass to 150 parts by mass, to 100 parts by mass of the total amount of the diimonium compound and the adhesive. If the amount of the solvent to be incorporated is less than 10 parts by mass, it may not be possible to sufficiently dissolve the diimonium compound or the adhesive. When the amount of the solvent to be incorporated is 150 parts by mass, it is possible to sufficiently dissolve the diimonium compound and the adhesive, and if it exceeds 150 parts by mass, coating tends to be difficult, and the subsequent drying may take time. Further, at the time of coating, the solvent is preferably made to be from 200 parts by mass to 2,000 parts by mass to 100 parts by mass of the total amount of the diimonium compound and the adhesive. Within such a range, coating can be carried out well.

The method for applying the coating fluid in the coating step is not particularly limited. For example, it is possible to employ a coating method such as a dip coating method, a spray coating method, a spinner coating method, a bead coating method, a wire bar coating method, a blade coating method, a roller coating method, a curtain coating method, a slit die coating method, a gravure coating method, a slit reverse coating method, a microgravure coating method or a comma coating method.

The heating step may be carried out, for example, by introducing the base film having the coating layer formed thereon into an oven and heating it at a temperature of at least 100° C. If the heating temperature is less than 100° C., it may not be possible to agglomerate or crystallize the diimonium compound to form a massive material. Or, even if it is possible to form a massive material, it may not be possible to bring the melting point of the massive material to be at least 200° C.

The heating temperature is not particularly limited so long as it is at least 100° C., but it is preferably at least 110° C. and usually preferably at most 150° C. When the heating temperature is 150° C., the diimonium compound can be sufficiently agglomerated or crystallized, and if it exceeds 150° C., the properties of the adhesive or the base film rather tend to be deteriorated.

The heating time is not particularly limited so long as the diimonium compound can be sufficiently agglomerated or crystallized, but it is usually preferably from 1 minute to 10 minutes. If the heating time is less than 1 minute, it is not easy to sufficiently agglomerate or crystallize the diimonium compound, or it may not be possible to sufficiently remove the solvent. When the heating time is 10 minutes, it is possible to sufficiently agglomerate or crystallize the diimonium compound, and if it exceeds 10 minutes, not only the productivity rather tends to be deteriorated, but also the properties of the adhesive or the base film may be deteriorated.

In the case of producing an optical filter by using an optical film of the present invention, for example, in a case where the optical film is one having an adhesive layer formed on one principal surface of a release film, the optical film may be bonded to another functional film by means of such an adhesive layer, then the release film is removed, and the rest may be bonded to a substrate, or it may likewise be bonded to another functional film, then the release film is removed, the rest may further be bonded to another functional film, and the obtained assembly may be bonded to a substrate by means of a known adhesive.

Further, for example, in a case where the optical film is one having an adhesive layer formed on one principal surface of a functional film, it may immediately be bonded to a substrate by means of such an adhesive layer, or it may be bonded to another film, and then the obtained assembly may be bonded to a substrate by means of a known adhesive to obtain an optical filter.

EXAMPLES

Now, the present invention will be described in further detail with reference to Examples, but it should be understood that the present invention is by no means limited to the following Examples. Examples 1 to 6 are Working Examples of the present invention, and Comparative Examples 1 to 3 are Comparative Examples.

Firstly, prior to the production of optical films, near infrared absorbing colorants to be incorporated to adhesive layers were synthesized.

[Colorant A]

2.2 Parts by mass of N,N,N',N'-tetrakis(p-aminophenyl)-p-phenylenediamine obtained by reducing an Ullmann reaction product of p-phenylenediamine and 1-chloro-4-nitrobenzene, was dissolved in 16 parts by mass of N,N-dimethylformamide, and from 6 to 12 parts by mass of alkyl bromide (alkyl group: n-propyl group) was added thereto, followed by a reaction at 130° C. for 10 hours.

The reaction solution was cooled and subjected to filtration. To the filtrate, 40 parts by mass of methanol was added, followed by stirring at a temperature of at most 5° C. for 1 hour, whereupon formed crystals were collected by filtration, washed with methanol and then dried to obtain dark brown crystals. With respect to the dark brown crystals, the number of substituent groups (the number of n-propyl groups) was measured by high performance liquid chromatography.

4.0 Parts by mass of the crystals were added to 20 parts by mass of N,N-dimethylformamide and dissolved by heating to 60° C., and then, 8 parts by mass of a 60 mass % aqueous solution of tris(trifluoromethanesulfonyl)carbonium acid was added. Further, a solution having 2 parts by mass of silver nitrate dissolved in 25 parts by mass of N,N-dimethylformamide, was added, followed by a reaction for 30 minutes. After cooling, precipitated silver was filtered off, and to the filtrate, 20 parts by mass of water was slowly dropwise added, followed by stirring for 15 minutes. Formed blackish brown crystals were collected by filtration, washed with 50 parts by mass of water and dried to obtain colorant A (a diimonium compound of the formula (1) wherein the number of substituent groups is 8 groups).

[Colorant B]

Colorant B (a diimonium compound of the formula (1) wherein the number of substituent groups is 5.7 groups) was obtained in the same manner as in the production of colorant A except that as the alkyl bromide, a mixture of alkyl bromide (alkyl group: n-propyl group) and alkyl bromide (alkyl group: i-butyl group) in a mass ratio of 6:2, was used.

[Colorant C]

Colorant C (a diimonium compound of the formula (1) wherein the number of substituent groups is 4.9 groups) was obtained in the same manner as in the production of colorant A except that as the alkyl bromide, a mixture of alkyl bromide (alkyl group: n-propyl group) and alkyl bromide (alkyl group: i-butyl group) in a mass ratio of 5.5:2.5, was used.

[Colorant D]

Colorant D (a diimonium compound of the formula (1) wherein the number of substituent groups is 0 group) was obtained in the same manner as in the production of colorant A except that as the alkyl bromide, only alkyl bromide (alkyl group: i-butyl group) was used.

[Colorant E]

Colorant E (a monovalent aluminum compound) was obtained in the same manner as in the production of colorant B except that the 60 mass % aqueous solution of tris(trifluoromethanesulfonyl)carbonium acid was changed to 3.5 parts by mass, and silver nitrate was changed to 0.8 part by mass.

[Colorant F]

Colorant F ($X^-$ in the diimonium compound of the formula (1) was changed) was obtained in the same manner as in the production of Colorant D except that the tris(trifluoromethanesulfonyl)carbonium acid was changed to tris(trifluoromethanesulfonyl)imide acid.

Now, Production Examples for adhesive solutions to be used for forming adhesive layers in optical films, will be shown below.

[Adhesive Solution X]

As monomer components, 60.8 parts by mass of n-butyl acrylate, 38 parts by mass of methyl acrylate, 1.0 part by mass of 2-hydroxyethyl acrylate and 0.2 part by mass of acrylamide, and as an initiator, 0.2 part by mass of azobisisobutyronitrile, were dissolved in an aqueous solution of ethyl acetate, followed by stirring at 60° C. for 17 hours to obtain an acrylic acid ester copolymer solution having a weight average molecular weight of 650,000 and a glass transition temperature of −25° C.

Such an acrylic acid ester copolymer solution was diluted with methyl ethyl ketone to adjust the solid content, ethyl acetate and methyl ethyl ketone to be in a mass ratio of 30:40:30. To 100 parts by mass of such a diluted solution, 0.2 part by mass of a trimethyloipropane-modified tolylene diisocyanate (tradename: CORONATE L, manufactured by Nippon Polyurethane Industry Co., Ltd., solid content: 75 mass %) as an isocyanate type curing agent, and 0.04 part by mass of 3-glycidoxypropyltrimethoxysilane (tradename: KBM-403, manufactured by Shin-Etsu Chemical Co., Ltd., solid content: 100 mass %) as a silane coupling agent, were added to obtain adhesive solution X.

[Adhesive Solution Y]

As monomer components, 61.5 parts by mass of n-butyl acrylate, 37.0 parts by mass of methyl acrylate, 1.0 part by mass of 2-hydroxyethyl acrylate and 0.5 part by mass of acrylamide, and as an initiator, 0.2 part by mass of azobisisobutyronitrile, were dissolved in an aqueous solution of ethyl acetate, followed by stirring at 60° C. for 10 hours to obtain an acrylic acid ester copolymer solution having a weight average molecular weight of 390,000 and glass transition temperature of −27° C.

Such an acrylic acid ester copolymer solution was diluted with methyl ethyl ketone to adjust the solid content, ethyl acetate and methyl ethyl ketone to be in a mass ratio of 30:40:30. To 100 parts by mass of such a diluted solution, 0.2 part by mass of a trimethyloipropane-modified tolylene diisocyanate (tradename: CORONATE L, manufactured by Nippon Polyurethane Industry Co., Ltd., solid content: 75 mass %) as an isocyanate type curing agent, was added to obtain adhesive solution Y.

[Adhesive Solution Z]

Adhesive solution Z was obtained in the same manner as in the preparation of adhesive solution X except that methyl ethyl ketone used for dilution was changed to toluene.

Example 1

To 15 parts by mass of methyl ethyl ketone (MEK), 0.15 part by mass of colorant A was added and dissolved by stirring for 10 minutes by a mixer. Further, to this colorant solution, 50 parts by mass of adhesive solution X was added and dissolved by stirring for 10 minutes to obtain a coating fluid.

Such a coating fluid was applied to a release film having a silicone layer formed on a PET film, by means of an applicator, to form a coating layer, which was heated for 3 minutes in an oven at 120° C. to form an adhesive layer. Such a release film having the adhesive layer formed thereon, was laminated on an antireflection film (tradename: RL7800, manufactured by NOF Corporation) to obtain an antireflection film provided with an adhesive layer, as an optical film.

Further, the release film was removed from such an antireflection film provided with the adhesive layer, and the antireflection film was laminated on a glass substrate by means of the adhesive layer, followed by heat treatment for 50 minutes under conditions of 60° C. and 0.95 MPa by using an autoclave, to obtain an optical filter.

Example 2

An optical filter was produced in the same manner as in the production of the optical filter in Example 1 except that colorant A was changed to colorant B, and its amount was changed to 0.45 part by mass.

Example 3

An optical filter was produced in the same manner as in the production of the optical filter in Example 2 except that adhesive solution X was changed to adhesive solution Y.

Example 4

An optical filter was produced in the same manner as in the production of the optical filter in Example 2 except that at the time of preparing the colorant solution, 0.1 part by mass of a porphyrin compound (tradename: TAP, manufactured by Yamada Kagaku Co., Ltd.) was further added.

Example 5

An optical filter was produced in the same manner as in the production of the optical filter in Example 4 except that instead of laminating the antireflection film provided with the adhesive layer directly to the glass substrate, the antireflection film provided with the adhesive layer was laminated via a metal mesh film.

Here, as the metal mesh film, a commercially available metal mesh film (tradename: AR50G90T-100, manufactured by Dai Nippon Printing Co., Ltd., construction: copper foil mesh/adhesive/PET film/adhesive/separator film) was used. The metal mesh film was disposed so that the metal mesh side became on the side of the antireflection film provided with the adhesive layer; and bonding of the metal mesh film and the glass substrate was carried out by means of an adhesive of the metal mesh film, and bonding of the metal mesh film and the antireflection film provided with the adhesive layer was carried out by means of the adhesive layer of the antireflection film provided with the adhesive layer.

Example 6

An optical filter was produced in the same manner as in the production of the optical filter in Example 1 except that colorant A was changed to colorant C, and its amount was changed to 0.45 part by mass.

Comparative Example 1

An optical filter was produced in the same manner as in the production of the optical filter in Example 1 except that colorant A was changed to colorant D, and its amount was changed to 0.45 part by mass.

Comparative Example 2

An optical filter was produced in the same manner as in the production of the optical filter in Example 1 except that colorant A was changed to colorant E, and its amount was changed to 0.45 part by mass.

Comparative Example 3

An optical filter was produced in the same manner as in the production of the optical filter in Example 1 except that methyl ethyl ketone was changed to toluene, colorant A was changed colorant F (particle size: 50 to 500 μm) and its amount was changed to 0.45 part by mass, and adhesive solution X was changed to adhesive solution Z.

In Table 1, the constructions of the optical filters in Examples 1 to 6 and Comparative Examples 1 to 3 are shown. Further, in Table 2, the melting point of a massive material in the optical film (the antireflection film provided with an adhesive layer) used for the preparation of each optical filter, and the melting point of the colorant incorporated to the adhesive layer, are shown.

Here, for the measurement of the melting point, a differential scanning calorimeter (tradename: DSC220C, manufactured by Seiko Instruments Inc.) was used, the sample weight was 10 g, the temperature-raising speed was 10° C./min, and the heat absorption peak temperature was taken as the melting point. Further, in Table 2, "-" means that no melting point was measured.

TABLE 1

| | | | Colorant (diimonium compound) | | | | | | | | | |
|---|---|---|---|---|---|---|---|---|---|---|---|---|
| | | | Number of substituent groups (number of n-propyl groups (among 8 groups)) [groups] | | | | Colorant porphyrin | Solvent | | Adhesive solution | | Thickness of |
| | | Type | Theoretical number of groups | Measured number of groups | $X^-$ | Amount [g] | Amount [g] | Type | Amount [g] | Type | Amount [g] | adhesive layer [μm] | Filter construction |
| Ex. | 1 | A | 8 | 8 | Bivalent C | 0.15 | — | MEK | 15 | X | 50 | 23 | 1 |
| | 2 | B | 6 | 5.7 | Bivalent C | 0.45 | — | MEK | 15 | X | 50 | 22 | 1 |
| | 3 | B | 6 | 5.7 | Bivalent C | 0.45 | — | MEK | 15 | Y | 50 | 26 | 1 |
| | 4 | B | 6 | 5.7 | Bivalent C | 0.45 | 0.1 | MEK | 15 | X | 50 | 23 | 1 |
| | 5 | B | 6 | 5.7 | Bivalent C | 0.45 | 0.1 | MEK | 15 | X | 50 | 23 | 2 |
| | 6 | C | 5.5 | 4.9 | Bivalent C | 0.45 | — | MEK | 15 | X | 50 | 23 | 1 |
| Comp. Ex. | 1 | D | 0 | 0 | Bivalent C | 0.45 | — | MEK | 15 | X | 50 | 23 | 1 |
| | 2 | E | 6 | 5.7 | Monovalent C | 0.45 | — | MEK | 15 | X | 50 | 23 | 1 |
| | 3 | F | 0 | 0 | Bivalent N | 0.45 | — | Toluene | 15 | Z | 50 | 23 | 1 |

TABLE 2

| | | Melting point [° C.] | |
|---|---|---|---|
| | | Adhesive layer | Colorant alone |
| Ex. | 1 | 230 | 234 |
| | 2 | 227 | 233 |
| | 3 | 227 | 233 |
| | 4 | 227 | 233 |
| | 5 | 227 | 233 |
| | 6 | 226 | 231 |
| Comp. Ex. | 1 | 197 | 230 |
| | 2 | — | 150 |
| | 3 | 165 | 165 |

As shown in Table 2, in each of Examples 1 to 6 wherein a diimonium compound of the formula (1) was used, and it was dissolved in a solvent and then heated to a temperature of at least 100° C., the massive material in the adhesive layer had a melting point of at least 200° C. in each case, thus indicating that a massive material containing a diimonium compound and having a melting point of at least 200° C. was contained in the adhesive layer. On the other hand, in each of Comparative Examples wherein a colorant other than a diimonium compound of the formula (1) was used, the melting point of the adhesive layer was not measured or even if measured, it was less than 200° C., thus indicating that the colorant compound in the adhesive layer did not form a massive material.

Then, with respect to the optical filters in Examples 1 to 6 and Comparative Examples 1 to 3, measurements of the optical properties (average visible transmittance, chromaticity, near infrared transmittance and haze) were carried out. Thereafter, by using a constant temperature container (manufactured by Tokyo Rikakikai Co., Ltd.), a heat resistance test was carried out at a temperature of 80° C. for a test time of 250 hours, whereupon the same measurements were carried out to obtain the property changes (after the heat resistance test—before the heat resistance test).

Here, for the average visible transmittance and the chromaticity, the spectrum was measured by using a spectrophotometer (ultraviolet/visible near infrared spectrophotometer, tradename: SolidSpec-3700, manufactured by Shimadzu Corporation), and the average visible transmittance (Tv) in the visible region (380 to 780 nm) and the chromaticity coordinate (x,y) were calculated in accordance with JIS Z8701-1999.

For the near infrared transmittance, the transmittances in the near infrared region (850 nm, 900 nm and 950 nm) were measured, and the near infrared transmittances at the respective wavelengths (T850, T900 and T950) were obtained by using indoor air transmittance for comparison. Further, the haze was measured by means of a turbidity meter (tradename: NDH5000W, manufactured by Nippon Denshoku Industries, Co., Ltd.).

In Table 3, the optical properties of the optical filters in Examples 1 to 6 and Comparative Examples 1 to 3 are shown. Further, in Table 4, the property changes after the heat resistance test (the respective "after the heat resistance test—before the heat resistance test" values as represented by Δ) are shown.

TABLE 3

| | | Tv | x | y | T850 [%] | T900 [%] | T950 [A] | haze |
|---|---|---|---|---|---|---|---|---|
| Ex. | 1 | 85.0 | 0.320 | 0.325 | 41.6 | 47.5 | 48.9 | 2.3 |
| | 2 | 75.3 | 0.332 | 0.331 | 7.9 | 13.4 | 16.3 | 2.6 |
| | 3 | 74.8 | 0.335 | 0.336 | 7.7 | 10.9 | 13.0 | 8.2 |
| | 4 | 36.0 | 0.264 | 0.264 | 7.1 | 11.8 | 14.3 | 3.5 |
| | 5 | 31.8 | 0.266 | 0.268 | 5.9 | 10.0 | 12.3 | 5.4 |
| | 6 | 76.6 | 0.332 | 0.332 | 7.9 | 12.1 | 13.8 | 4.1 |
| Comp. Ex. | 1 | 72.6 | 0.324 | 0.333 | 5.8 | 0.8 | 0.1 | 0.8 |
| | 2 | 74.0 | 0.390 | 0.487 | 9.9 | 5.1 | 4.4 | 0.8 |
| | 3 | 74.5 | 0.323 | 0.335 | 5.3 | 0.6 | 0.1 | 4.0 |

TABLE 4

| | | ΔTv | Δx | Δy | ΔT850 | ΔT900 | ΔT950 | Δhaze |
|---|---|---|---|---|---|---|---|---|
| Ex. | 1 | 0.3 | 0.001 | 0.004 | 2.8 | −1.3 | −2.0 | 4.4 |
| | 2 | 0.9 | 0.004 | 0.008 | 0.6 | −2.5 | −3.5 | 4.0 |
| | 3 | −0.7 | 0.001 | 0.002 | 2.3 | 1.7 | 1.4 | −1.2 |
| | 4 | −0.1 | 0.004 | 0.008 | 0.1 | −1.8 | −2.4 | 3.7 |
| | 5 | 0.0 | 0.002 | 0.004 | 0.4 | −0.2 | −0.4 | 2.5 |
| | 6 | 0.0 | 0.004 | 0.006 | 1.3 | −2.3 | −2.6 | 2.5 |
| Comp. Ex. | 1 | 6.0 | 0.012 | 0.010 | 10.8 | 15.1 | 15.9 | 7.8 |
| | 2 | 5.3 | −0.025 | −0.061 | 17.6 | 14.9 | 14.3 | 5.6 |
| | 3 | 6.8 | 0.008 | 0.020 | 27.7 | 19.8 | 14.5 | 2.1 |

As shown in Table 4, with respect to the optical filters in Examples 1 to 6 wherein a diimonium compound of the formula (1) was used, and the melting point of the adhesive layer became at least 200° C., in each case, it was observed that the property change by the heat resistance test was suppressed.

Especially with respect to the optical filters in Examples 2 to 6 wherein a diimonium compound wherein the number of substituent groups is at most 6 groups, was used, it was observed that the optical properties, particularly the initial optical properties, became good, since the solubility of the diimonium compound was high, and the sufficient content was attained.

INDUSTRIAL APPLICABILITY

The optical film of the present invention is an optical film which is excellent in the productivity such that a task to provide a conventional near infrared absorption film can be omitted and wherein deterioration of a diimonium compound as a near infrared absorbing colorant in the adhesive layer is prevented, and thus, it is useful, for example, as an optical filter for a display device.

This application is a continuation of PCT Application No. PCT/JP2011/064588, filed Jun. 24, 2011, which is based upon and claims the benefit of priority from Japanese Patent Application No. 2010-145315 filed on Jun. 25, 2010. The contents of those applications are incorporated herein by reference in its entirety.

What is claimed is:

1. An optical film comprising a base film and an adhesive layer which is formed on the base film and has a massive material dispersed in an adhesive, wherein the massive material contains a diimonium compound represented by the following formula (1) and has a melting point of at least 200° C.:

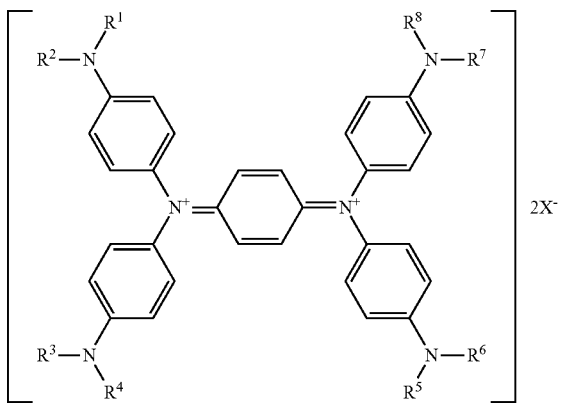

(1)

wherein $R^1$ to $R^8$ represent each independently an unsubstituted or substituted, same or different, $C_{1-6}$ aliphatic hydrocarbon group, provided that from 4.9 to 8 groups among $R^1$ to $R^8$ are a $C_{1-3}$ aliphatic hydrocarbon group (in which some of hydrogen atoms may be substituted by halogen atoms), and $X^-$ represents $(R^9SO_2)_3C^-$, wherein $R^9$ represents a $C_{1-4}$ aliphatic hydrocarbon group which is unsubstituted or substituted by a halogen atom.

2. The optical film according to claim 1, wherein the $C_{1-3}$ aliphatic hydrocarbon group among $R^1$ to $R^8$ is a propyl group, and other aliphatic hydrocarbon groups are butyl groups.

3. The optical film according to claim 1, wherein the adhesive layer contains from 90 mass % to 99 mass % of the adhesive.

4. The optical film according to claim 1, wherein the adhesive layer contains the diimonium compound in an amount of from 0.5 part by mass to 5 parts by mass per 100 parts by mass of the adhesive.

5. The optical film according to claim 1, wherein the adhesive is an acrylic adhesive, a silicone-type adhesive, a urethane-type adhesive or a butadiene-type adhesive.

6. The optical film according to claim 1, wherein the melting point of the massive material is lower by from 1 to 20° C. than the melting point of the contained diimonium compound.

7. The optical film according to claim 6, wherein the melting point of the massive material is lower by from 2 to 10° C. than the melting point of the contained diimonium compound.

8. The optical film according to claim 6, wherein the melting point of the massive material is lower by from 3 to 8° C. than the melting point of the contained diimonium compound.

9. The optical film according to claim 1, wherein the adhesive layer further contains a near infrared absorbing colorant having the maximum absorption wavelength ($\lambda_{max}$) within a range of from 800 nm to 1,100 nm.

10. An optical filter using the optical film as defined in claim 1.

11. The optical film according to claim 1, wherein from 4.9 to 7 groups among $R^1$ to $R^8$ are a $C_{1-3}$ aliphatic hydrocarbon group.

12. The optical film according to claim 1, wherein from 4.9 to 6 groups among $R^1$ to $R^8$ are a $C_{1-3}$ aliphatic hydrocarbon group.

13. The optical film according to claim 1, wherein the melting point is at most 250° C.

14. The optical film according to claim 1, wherein the melting point is at most 240° C.

15. The optical film according to claim 1, wherein the melting point is at most 230° C.

16. The optical film according to claim 1, wherein $R^9$ represents a $C_{1-4}$ aliphatic hydrocarbon group which is substituted by at least one fluorine group.

17. A process for producing an optical film, which comprises:
a mixing step of mixing an adhesive, a diimonium compound represented by the following formula (1) and a solvent capable of dissolving the diimonium compound, to prepare a coating fluid,
a coating step of applying the coating fluid on a base film to form a coating layer, and
a heating step of heating the coating layer at a temperature of at least 100° C. to form an adhesive layer:

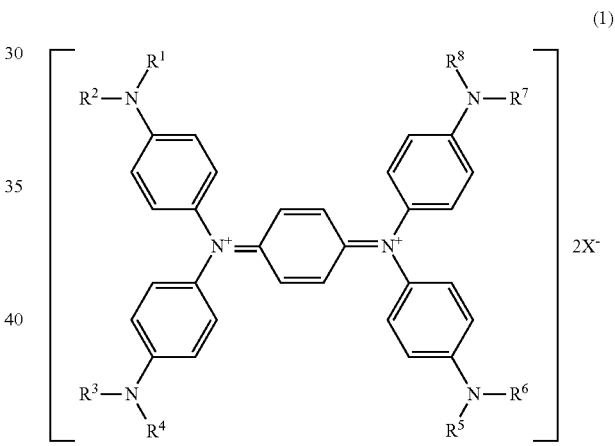

(1)

wherein $R^1$ to $R^8$ represent each independently an unsubstituted or substituted, same or different, $C_{1-6}$ aliphatic hydrocarbon group, provided that from 4.9 to 8 groups among $R^1$ to $R^8$ are $C_{1-3}$, and $X^-$ represents $(R^9SO_2)_3C^-$ wherein $R^9$ represents a $C_{1-4}$ aliphatic hydrocarbon group which is unsubstituted or substituted by a halogen atom.

18. The process for producing an optical film according to claim 17, wherein in the mixing step, the diimonium compound and the solvent are mixed, and then, the adhesive is added and mixed thereto.

19. The process for producing an optical film according to claim 17, wherein the solvent is a ketone type solvent.

* * * * *